United States Patent
Diab et al.

(10) Patent No.: US 7,870,401 B2
(45) Date of Patent: Jan. 11, 2011

(54) SYSTEM AND METHOD FOR POWER OVER ETHERNET PROVISIONING FOR A COMPUTING DEVICE USING A NETWORK USER PROFILE

(75) Inventors: Wael William Diab, San Francisco, CA (US); Stephen Bailey, Portola Valley, CA (US)

(73) Assignee: Broadcom Corporation, Irvine, CA (US)

( * ) Notice: Subject to any disclaimer, the term of this patent is extended or adjusted under 35 U.S.C. 154(b) by 724 days.

(21) Appl. No.: 11/839,140

(22) Filed: Aug. 15, 2007

(65) Prior Publication Data

US 2009/0049315 A1 Feb. 19, 2009

(51) Int. Cl.
*G06F 1/00* (2006.01)
*G06F 11/00* (2006.01)

(52) U.S. Cl. ............... 713/300; 713/310; 714/14
(58) Field of Classification Search ............ 713/300
See application file for complete search history.

(56) References Cited

U.S. PATENT DOCUMENTS

| | | | |
|---|---|---|---|
| 6,473,608 B1 * | 10/2002 | Lehr et al. | 455/402 |
| 6,546,494 B1 * | 4/2003 | Jackson et al. | 713/300 |
| 7,337,336 B2 * | 2/2008 | Ferentz et al. | 713/300 |
| 7,472,290 B2 * | 12/2008 | Diab et al. | 713/300 |
| 2006/0047800 A1 | 3/2006 | Caveney et al. | |
| 2006/0143583 A1 | 6/2006 | Diab et al. | |
| 2007/0110360 A1 * | 5/2007 | Stanford | 385/14 |
| 2008/0005433 A1 | 1/2008 | Diab et al. | |
| 2008/0005600 A1 * | 1/2008 | Diab et al. | 713/300 |
| 2008/0005601 A1 | 1/2008 | Diab | |
| 2008/0016263 A1 | 1/2008 | Diab et al. | |

FOREIGN PATENT DOCUMENTS

WO WO 2004109439 A2 12/2004
WO WO 2004111757 A2 12/2004

OTHER PUBLICATIONS

International Search Report, Nov. 26, 2008.

* cited by examiner

*Primary Examiner*—Suresh K Suryawanshi
(74) *Attorney, Agent, or Firm*—Duane S. Kobayashi

(57) ABSTRACT

A system and method for power over Ethernet (PoE) provisioning for a computing device using a network profile. Various types of power management information can be used in a process for determining a power request/priority. Power management information such as user information or device information can be stored in a profile in a network database. This network database can be accessed by a switch in determining a power request/priority for a computing device.

13 Claims, 4 Drawing Sheets

SYSTEM AND METHOD FOR POWER OVER ETHERNET PROVISIONING FOR A COMPUTING DEVICE USING A NETWORK USER PROFILE

BACKGROUND

1. Field of the Invention

The present invention relates generally to Power over Ethernet (PoE) and, more particularly, to a system and method for PoE provisioning for a computing device using a network profile.

2. Introduction

The IEEE 802.3af and 802.3at PoE specifications provide a framework for delivery of power from power sourcing equipment (PSE) to a powered device (PD) over Ethernet cabling. Various types of PDs exist, including voice over IP (VoIP) phones, wireless LAN access points, Bluetooth access points, network cameras, computing devices, etc.

Computing devices such as portable computers are used extensively in corporate environments. In these environments, PoE networks can play a key role when deployed in various areas such as conference rooms. Here, user flexibility is enabled as power is provided to the computing device via a single network connection.

One of the challenges in providing PoE support for the multitude of computing devices is the proper allocation of power amongst a plurality of computing devices. Not only can power supplies be limited, but power allocation between computing devices can also vary significantly based on such factors as hardware components (internal and external), usage modes, user behavior, etc.

In the PoE process, a valid device detection is first performed. This detection process identifies whether or not it is connected to a valid device to ensure that power is not applied to non-PoE capable devices. After a valid PD is discovered, the PSE can perform a power classification. In a conventional 802.3af allocation, each PD would initially be assigned a 15.4 W power classification after a Layer 1 discovery process. A Layer 2 classification engine can be used to reclassify the PD. Such a Layer 2 classification process can be included in PoE systems such as 802.3af, 802.3 at or proprietary schemes.

In one example, the classification process can be based on power management information that is stored at the computing device. This locally-resident power management information would then be sent to the PSE via Layer 2 to enable power request/priority processing at the PSE. A disadvantage of such a PoE processing scheme is the reliance on custom configuration information on the computing device. This can often prove problematic when considering an IT department's desire for mass deployment of a standard software image to the installed base of computing devices. What is needed therefore is an improved mechanism for enabling PoE power request/priority determinations.

SUMMARY

A system and/or method for PoE provisioning for a computing device using a network profile, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
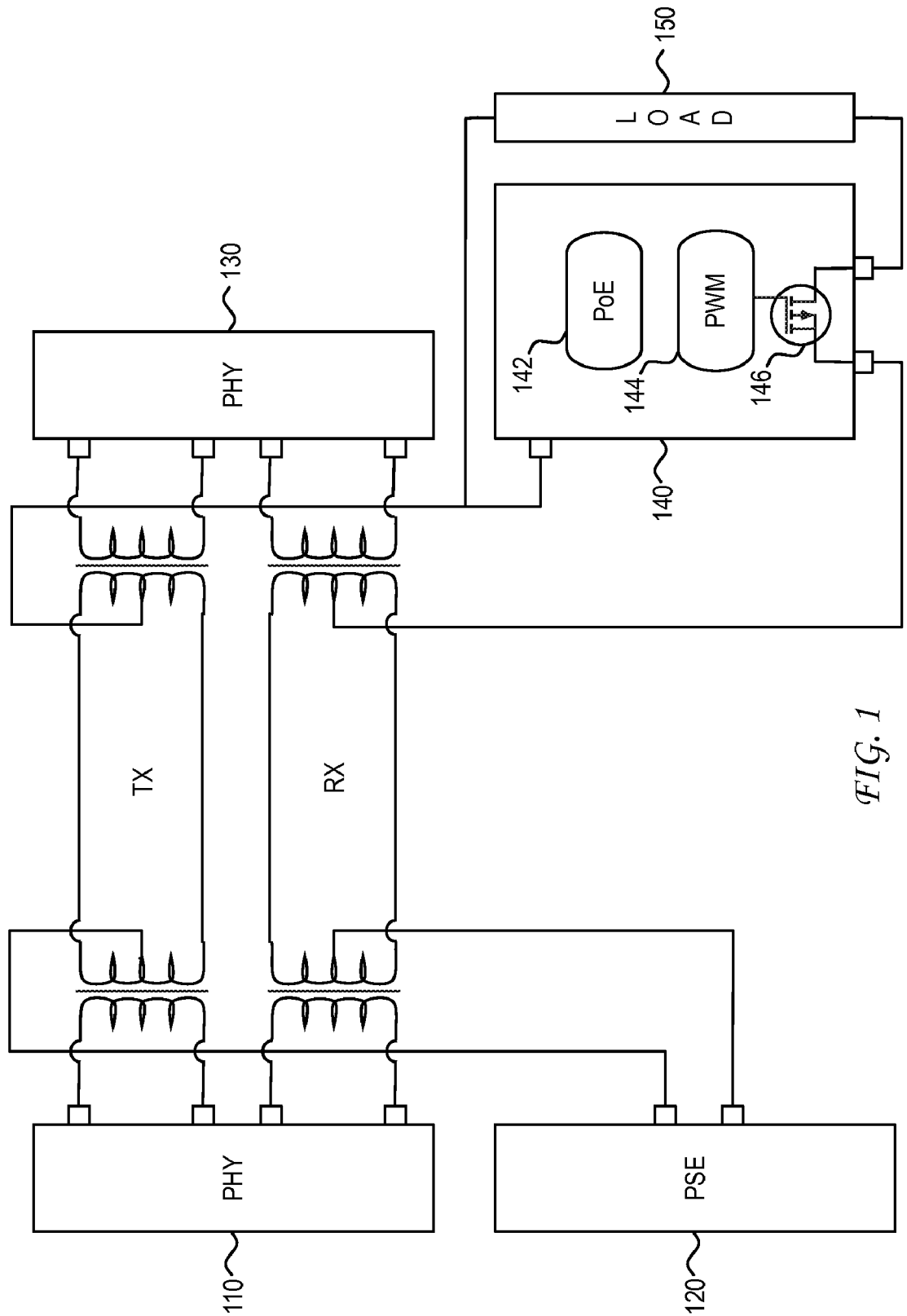
FIG. 1 illustrates an embodiment of a PoE system.

FIG. 1 illustrates an embodiment of a power over Ethernet (PoE) system. As illustrated, the PoE system includes power sourcing equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10 GBASE-T and/or any other layer 2 PHY technology.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at specification, on the other hand, a PSE can deliver up to 30 W of power to a PD over 2-pairs or 60 W of power to a PD over 4-pairs. Other proprietary solutions can potentially deliver even higher levels of power to a PD. In general, high power solutions are often limited by the limitations of the cabling.

As noted, one of the responsibilities of PSE 120 is to manage the power that is supplied to PD 140. One example of a PD is a computing device, such as a laptop computer or other software controlled device such as embedded devices having an operating system (OS). In general, a computing device can represent any device that can process Layer 2 packets for PoE communication and has a computing subsystem. Computing devices can have highly varying power requirements depending on the existence and state of operation of various internal or externally supported components. These components need not be uniform and can vary greatly between devices depending on the manufacturer and component suppliers. Power usage can also be highly dependent on the application(s) running on the computing device.

Computing devices that are connected to enterprise networks are often connected on a non-permanent basis. Consider, for example, a corporate conference room that has multiple Ethernet ports for conference participants. In this conference room context, the switch box typically includes 5-20 ports for the entire conference room. In typical conference room usage scenarios, the limited PSE power supply would often be oversubscribed. This results since each computing device may require 13 W to hold the battery level at a steady state under a typical usage scenario, and greater power for charging of the battery in the portable computing device. In combination, the PSE only has enough power to support a subset of the computing devices, each of which is attempting to extract as much power from the PSE as possible. The allocation of power to the various competing computing devices represents a significant challenge. Such a challenge is best met by identifying differences in the various computing device needs and priorities.

Figure 2:
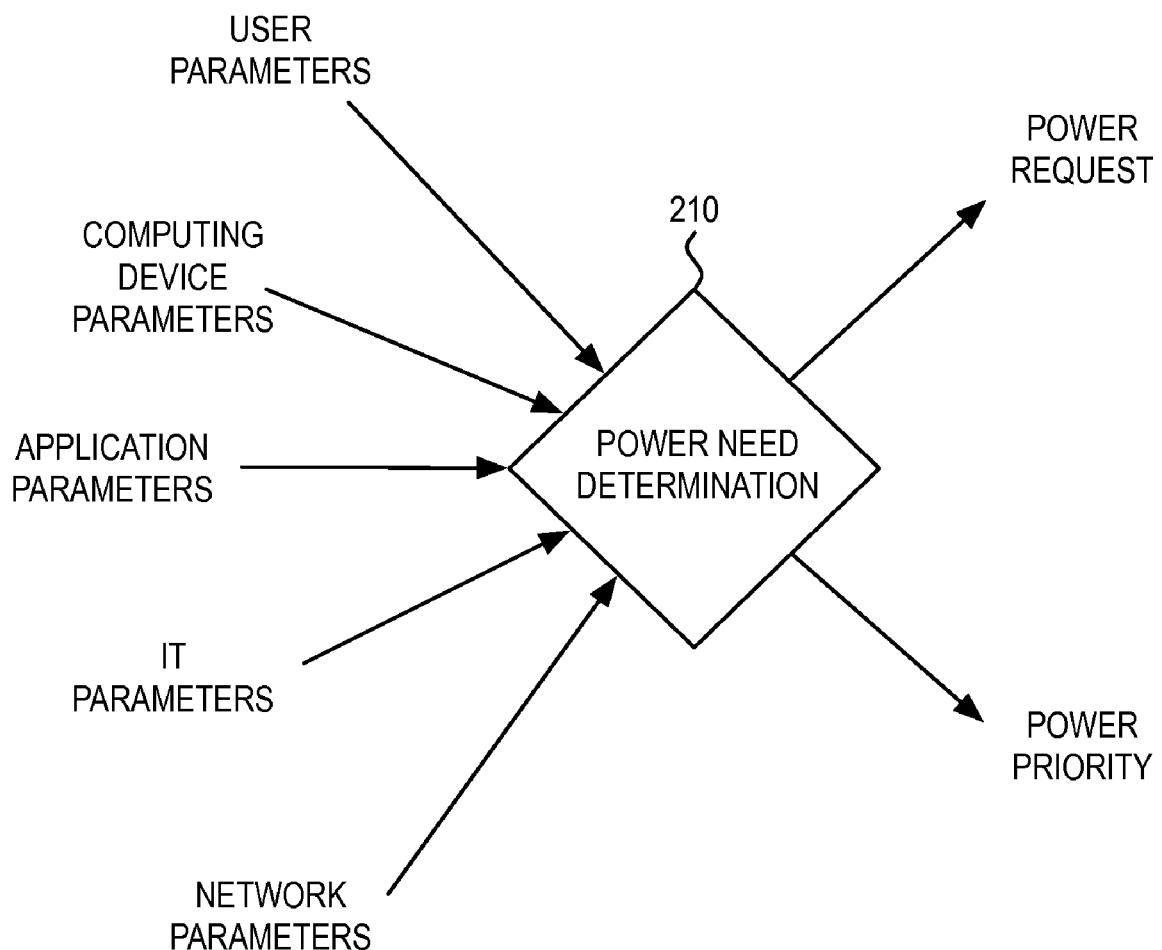
FIG. 2 illustrates an example mechanism of generating a power request and priority.

FIG. 2 illustrates an example mechanism of generating a power request and priority for a computing device. As illustrated, various power management information can be used as inputs to power need determination 210. In this example, the power management information includes general classes of information such as user parameters (e.g., management, engineering, marketing, admin, user priority level, etc.); computing device parameters (e.g., battery capacity, battery life, system states, processor states, device states, etc.); application parameters (e.g., mode of operation, application load, etc.); IT parameters (e.g., computing device model, IT policies, performance characteristic data, etc.); and network parameters (e.g., length of cable, type of cable, etc.). With this input set of power management information, power need determination 210 can then produce a power request and power priority for the computing device.

In the example of FIG. 2, the classes of power management information can be said to include usage information and customized information. Here, usage information can relate to parameters that change between uses. For example, usage information can include a system state, mode of operation, length of cable, etc. Customized information, on the other hand, can relate to customized parameters that would be consistent between uses. For example, customized parameters that would be consistent between uses can include device information (e.g., battery profiles based on model number), user information (e.g., user priority level), or other profile information (e.g., office policies, power determination algorithms, etc.).

Conventionally, the various types of power management information would be communicated by the computing device to the PSE for power need determination. In one embodiment, this communication can be effected via Layer 2 packets (e.g., LLDP). As usage information is created at the computing device during a particular PoE use, its communication to the PSE is necessary if the PSE is to perform the power need determination.

Customized information, on the other hand, would not be created during a particular PoE use. Rather, customized information would be loaded onto a computing device during computing device configuration. One of the problems of such a configuration process is the loading of a non-standard software image onto the computing device. Non-standard software image administration is expensive and time consuming for an IT department, which handles software rollouts for thousands of computing devices.

Figure 3:
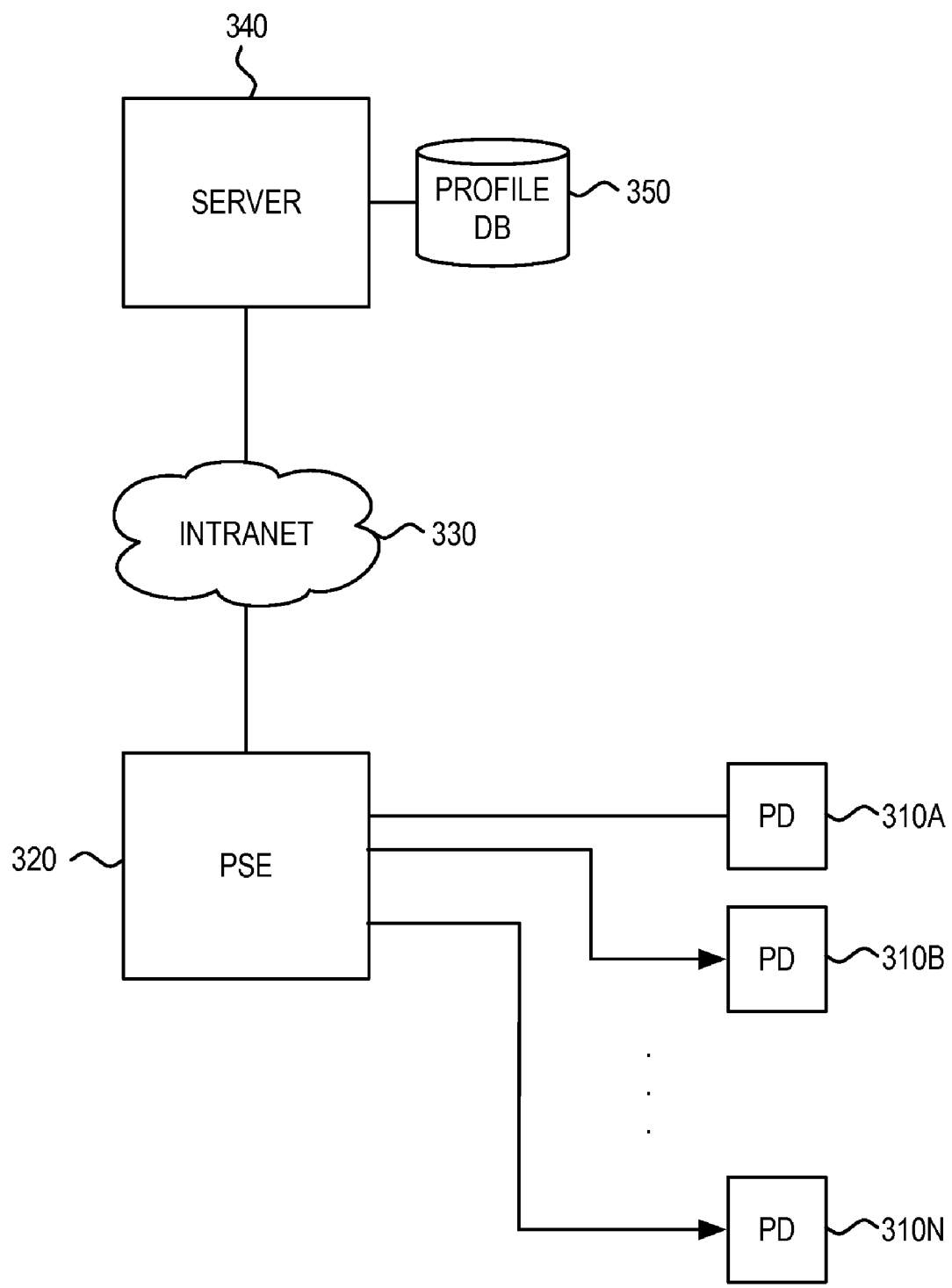
FIG. 3 illustrates an embodiment of a network profile access system.

It is therefore a feature of the present invention that customized information can be included in the PoE power need determination process while maintaining the use of standard software images. In one embodiment, customized information is stored in a profile database that is accessible by a PoE system via a network (e.g., Intranet). FIG. 3 illustrates an example of such a network configuration.

As illustrated, PSE 320, which can be part of a switch, supports a plurality of PDs 310A-310N. In performing a power need determination for PDs 310A-310N, PSE 320 would access profile database 350 via server 340. Server 340 is linked to PSE 320 via intranet 330. To illustrate the utility of such a network configuration reference is now made to the flowchart of FIG. 4.

Figure 4:
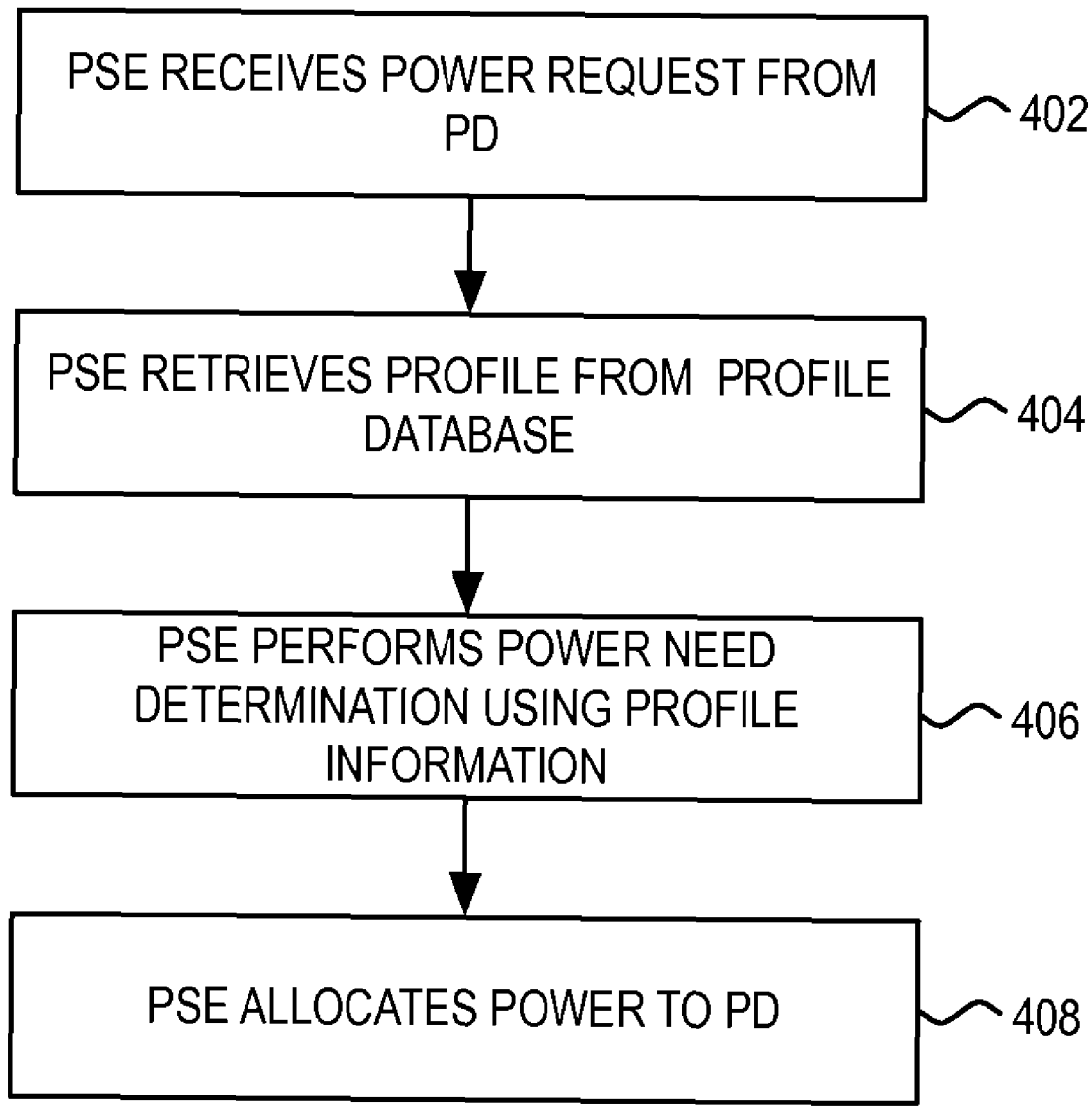
FIG. 4 illustrates a flowchart of a power need determination process using network profiles.

As illustrated, the process of FIG. 4 begins at step 402 where PSE 320 receives a power request from a PD. In one embodiment, this power request is received after detection of the PD as a valid PoE device. As noted above, this power request can be accompanied by usage information that is collected by the PD.

At step 404, PSE 320 then retrieves a profile for the user and/or PD from profile database 350. Here, it should be noted that the profile database need not be accessed when standard power requests are received. In that case, the profile database can be accessed when updates to a standard power request are received. Also, the profile database would not be accessed if no connection exists between PSE 320 and server 340. In one embodiment, the database access is based on a user ID and password. In another embodiment, the database access is based on a unique identifier such as MAC address. As noted, the retrieved profile information can relate to the user and/or PD. In various embodiments, the database access can be facilitated by Layer 2 or Layer 3 mechanism.

In one example, a profile can include device-related information such as a computing device model, computing device components, performance characteristic data, IT policies, etc. In another example, a profile can include user information such as a user priority level, a user position, user preferences, user authorizations, etc. One advantage of storing user information in a network profile rather than the computing device itself is the portability of the user information across computing devices. For example, the user information (e.g., user priority level) in the network profile can be used in a power need determination whether or not the user is using his assigned computing device or borrowing another individual's computing device.

After the profile information is retrieved from profile database 350, PSE 320 can then perform the power need determination at step 406. In this power need determination, PSE 320 can consider power management information that is received from the PD as well as power management information that is received from profile database 350. As would be appreciated, the specific process by which the power request/priority is determined would be implementation specific. Finally, after the power need determination process of step 406 completes, PSE 320 would then allocate power to the PD at step 408.

As has been described, power management information for use in a power need determination process for a PD can be retrieved from a database that is remote from the PD. This database retrieval can be initiated by the PSE at some point after a PD is coupled to the PSE. In the embodiment described above, this database retrieval is initiated after a power request is sent by the PD. In another embodiment, the database retrieval can occur upon the first detection of the PD by the switch.

In one embodiment, the profile can be retrieved from the profile database by the computing device instead of the PSE. In this embodiment, the retrieved profile information can be included with other usage information as part of the computing device's power request to the PSE. In yet another embodiment, the PSE can store a local copy of the profile database.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power over Ethernet method in a power sourcing equipment that delivers power over a network cable to a computing device, comprising:

receiving a power request from said computing device over said network cable;

sending a request to a database for a profile associated with a user of said computing device, said database being remote from said computing device, said request including a user identifier that enables said database to identify said profile that is associated with said user; and determining an amount of power to be delivered to said computing device via said network cable, said determination being based at least in part on information received in response to said database request, said received information including information about a user of said computing device.

2. The method of claim 1, wherein said computing device is a portable computing device.

3. The method of claim 1, wherein said sending comprises sending via an intranet.

4. The method of claim 1, wherein said sending occurs after said receiving.

5. The method of claim 1, wherein said received information further includes information associated with said computing device.

6. The method of claim 1, wherein said information received in response to said database request includes one or more of a user priority level, a user position, a user preference and a user authorization.

7. The method of claim 1, wherein said receiving comprises receiving via Layer 2 communication.

8. A power over Ethernet system, comprising:

a network database that stores profile information for power over Ethernet usage of computing devices, said profile information including a first plurality of device profiles for a corresponding plurality of computing devices and a second plurality of user profiles for a corresponding plurality of users; and a power sourcing equipment that is coupled to a computing device via a network cable, said network cable enabling communication of a power request from said computing device to said power sourcing equipment, wherein an amount of power to be supplied by said power sourcing equipment to said computing device is determined based at least in part on information from a user profile that is retrieved by said power sourcing equipment from said network database, said retrieved user profile being accessed by said power sourcing equipment using a user identifier.

9. The system of claim 8, wherein said power sourcing equipment accesses said network database after said power request is received from said computing device.

10. The system of claim 8, wherein said power request is received via Layer 2 communication.

11. A power over Ethernet method, comprising:

retrieving, from a network database, a profile associated with usage of a computing device, wherein said network database is remote from said computing device, wherein said retrieving comprises retrieving via a user identifier; and determining, based on said profile, a power level or priority level for the delivery of power by a power sourcing equipment to said computing device via a network cable.

12. The method of claim 11, wherein said retrieving comprises retrieving by a power sourcing equipment.

13. The method of claim 11, wherein said retrieving comprises retrieving by said computing device.

* * * * *